(12) United States Patent
Schäfer

(10) Patent No.: US 7,448,513 B2
(45) Date of Patent: Nov. 11, 2008

(54) REUSABLE HINGED-LID SHIPPING/STORAGE BOX

(75) Inventor: Gerhard Schäfer, Neunkirchen (DE)

(73) Assignee: Fritz Schafer GmbH, Neunkirchen (DE)

(*) Notice: Subject to any disclaimer, the term of this patent is extended or adjusted under 35 U.S.C. 154(b) by 660 days.

(21) Appl. No.: 11/108,035

(22) Filed: Apr. 12, 2005

(65) Prior Publication Data
US 2005/0233621 A1   Oct. 20, 2005

(30) Foreign Application Priority Data
Apr. 20, 2004 (DE) .................. 20 2004 006 398 U
Jan. 18, 2005 (DE) .................. 20 2005 000 845 U

(51) Int. Cl.
*B65D 51/04* (2006.01)

(52) U.S. Cl. .................. 220/826; 220/832; 220/833; 220/835

(58) Field of Classification Search .................. 220/831, 220/832, 826, 270, 276, 675, 812, 817, 835, 220/840, 848, 323, 324, 326, 1.5; 206/506; 292/62, 95, 102, 108, 109
See application file for complete search history.

(56) References Cited

U.S. PATENT DOCUMENTS 4,161,261 A * 7/1979 Frater .................. 220/826
5,501,503 A * 3/1996 Thayer .................. 296/146.8
D493,282 S   7/2004 Dubois et al.

FOREIGN PATENT DOCUMENTS

EP   0 104 136   3/1984
EP   1 428 764   6/2004

* cited by examiner

Primary Examiner—Quang D. Thanh
Assistant Examiner—Elizabeth Volz
(74) Attorney, Agent, or Firm—Andrew Wilford

(57) ABSTRACT

A box has a floor, end walls projecting upward from the floor, side walls projecting upward from the floor and bridging the end walls, and a pair of cover halves hinged at upper edges of the side walls and each pivotal between a closed position and an open position. Respective latches on the cover halves each have an outer grip part projecting from the outer face of the respective cover half and an inner latch part projecting from an inner face of the respective cover half. The end walls have keeper formations in which the latch parts are engageable in the closed position. The latches are shiftable on the respective cover halves to disengage from the respective keeper formations. Formations on the outer faces of the side walls latchingly engage the grip parts in the open position for retaining the cover halves in the open positions.

7 Claims, 3 Drawing Sheets

REUSABLE HINGED-LID SHIPPING/STORAGE BOX

FIELD OF THE INVENTION

The present invention relates to box for shipping or storage. More particularly this invention concerns such a box having a hinged lid.

BACKGROUND OF THE INVENTION

A standard reusable transport/storage box, typically made of injection-molded plastic, has a floor, a pair of upstanding long side walls, and a pair of short upstanding end walls that bridge ends of the side walls. The walls are formed as isosceles trapezoids with their larger ends up so that the boxes can be nested. As described in EP 1,428,764 and U.S. Pat. No. D493,282 of DuBois two identical cover halves are secured by hinges to upper edges of the side walls. These cover halves can be pivoted between a closed position in which they are horizontal and coplanar and their toothed outer edges fit together to close the top of the box and an open position in which each cover half hangs down from the respective hinge against the respective side wall of the box.

German 104,136 of Oppenländer describes latches each having a slidable latch member that serves to secure the respective cover half to the upper edge of the box in the closed positions. These latches are constructed such that when the cover halves are moved into the closed position, they fit into and mate with holes on the upper end-wall edges. To release the cover halves, it is necessary to manually slide the latches into a releasing position, then owing up the cover halves.

A problem with such boxes is that, when they are open, the pendant cover halves are unstable. So long as the boxes are sitting upright, these cover halves hang straight down, out of the way, but when they are not level, the cover halves can move into inconvenient positions. Furthermore to nest the boxes together when empty, as is done for instance when they are being returned, it is necessary to carefully press the two cover halves of one box against the respective side cover halves before fitting the one box into another box. If the side cover halves are not positioned flatly against the respective side cover halves, the boxes cannot be nested.

OBJECTS OF THE INVENTION

It is therefore an object of the present invention to provide an improved storage/shipping box.

Another object is the provision of such an improved storage/shipping box that overcomes the above-given disadvantages.

SUMMARY OF THE INVENTION

A box has according to the invention a floor, end walls projecting upward from the floor, side walls projecting upward from the floor and bridging the end walls, and a pair of cover halves hinged at upper edges of the side walls and each pivotal about a respective hinge axis between a closed position with the cover halves generally coplanar and upwardly closing the box and an open position with the cover halves upright and outer faces of the cover halves engaging outer faces of the side walls. Respective latches on the cover halves each have an outer grip part projecting from the outer face of the respective cover half and an inner latch part projecting from an inner face of the respective cover half. The end walls have keeper formations in which the latch parts are engageable in the closed position to secure the cover halves in the closed position. The latches are shiftable on the respective cover halves to disengage from the respective keeper formations. Formations on the outer faces of the side walls latchingly engage the grip parts in the open position for retaining the cover halves in the open positions.

This system therefore employs the standard latch to not only secure the cover halves in the closed position, but to secure them flat against the side walls in the open position. Thus when the boxes are opened, the cover halves will sit flatly and stably against the side walls, even if the boxes are tilted or inverted. The cover halves can be unlatched from the side walls either by forcibly pulling them out, or by actuating the latches much as they are actuated to shift the cover halves out of the closed positions.

According to the invention the formations are cutouts having undercuts in which the respective grip parts fit generally complementarily. In fact the standard latch has a hooked grip part that can be used without modification to fit with a complementary under cut cutout so as to effectively latch the cover half to the side wall. The same latching action that is used to secure the cover half atop the box, that is to its upper edge, is used to secure it flat against the box side.

In accordance with the invention the cover halves are formed on their outer faces with handles and the side walls are formed on their outer faces with formations in which the handles are latchingly engageable. The formations in which the handles are engageable are undercut. These formations are shaped generally complementarily to the respective handles and grip parts.

The latches according to the invention are shiftable radially of the respective axes. The grip parts are hooks. Each latch is formed integrally with a spring that urges it into one end position which corresponds to the retaining position it is in when it is holding the respective cover half down in place in the closed position on the box or when it is holding it flat against the respective box side. Sliding the latch against this spring force into a freeing position disengages it to allow the cover half to moved out of the position it is in. At the same time the spring biasing makes it possible simply to push the cover half into place atop the box or against its side to latch it in place. When the undercuts on the box sides are not too deep, the cover halves can be pulled away from the sides when the cutouts can back the latches against their springs.

BRIEF DESCRIPTION OF THE DRAWING

The above and other objects, features, and advantages will become more readily apparent from the following description, reference being made to the accompanying drawing in which.

SPECIFIC DESCRIPTION

Figure 2:
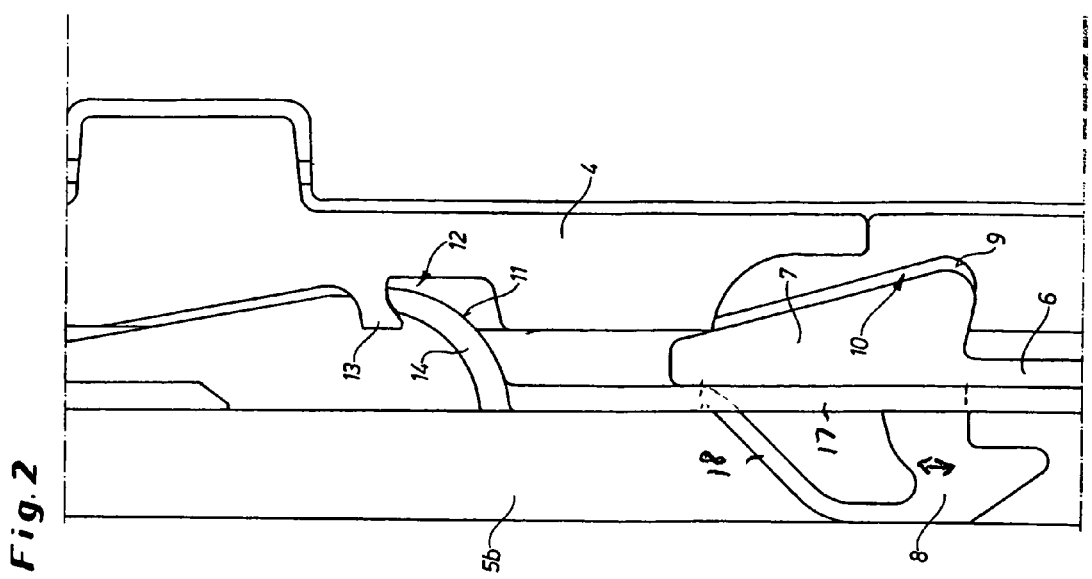
FIG. 2 is a large-scale view of the detail indicated at II in FIG. 1.
Figure 1:
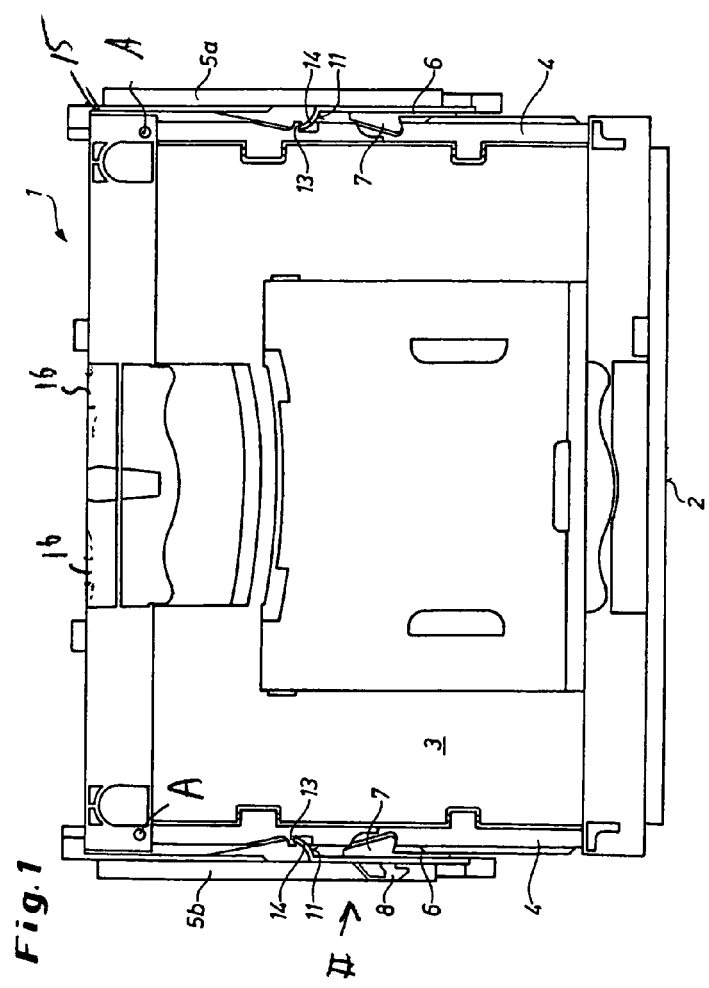
FIG. 1 is an end view of the box according to the invention with the side cover halves in the open condition.
Figure 4:
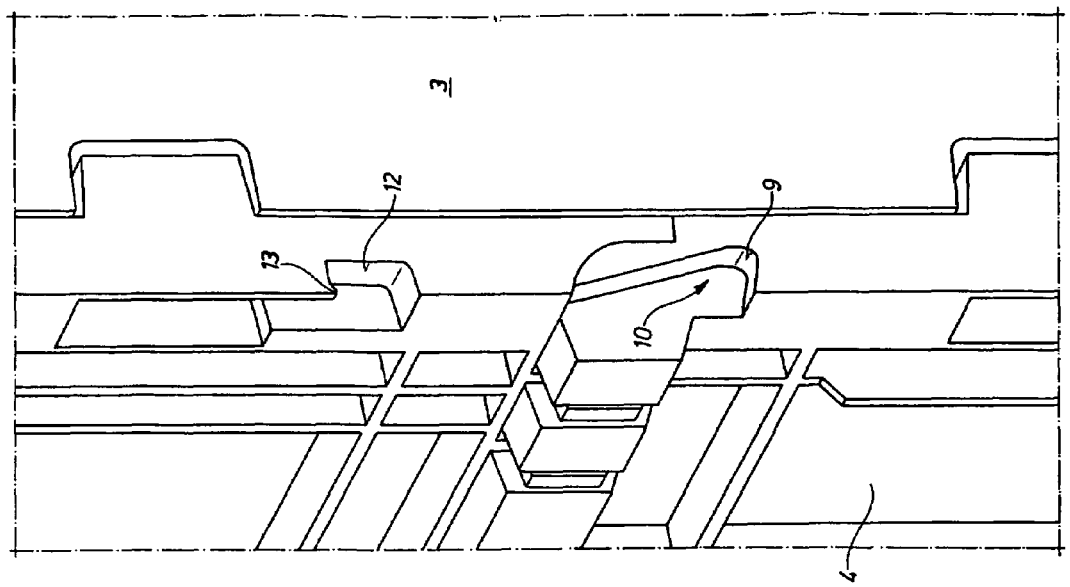
FIG. 4 is a perspective view of a detail of the box in the closed condition.
Figure 3:
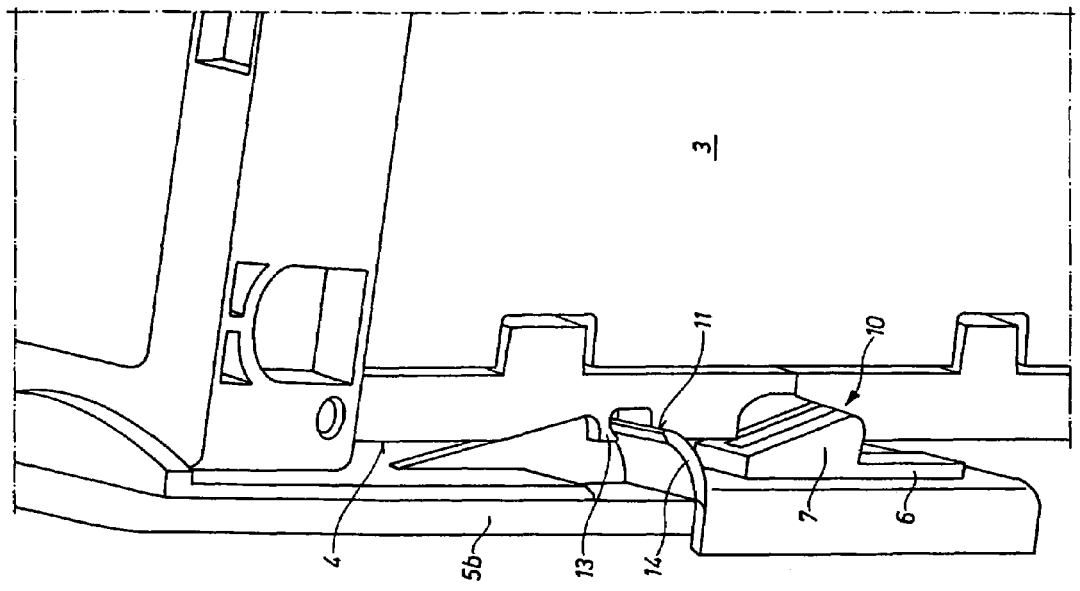
FIG. 3 is a perspective view of the detail of FIG. 2.
Figure 6:
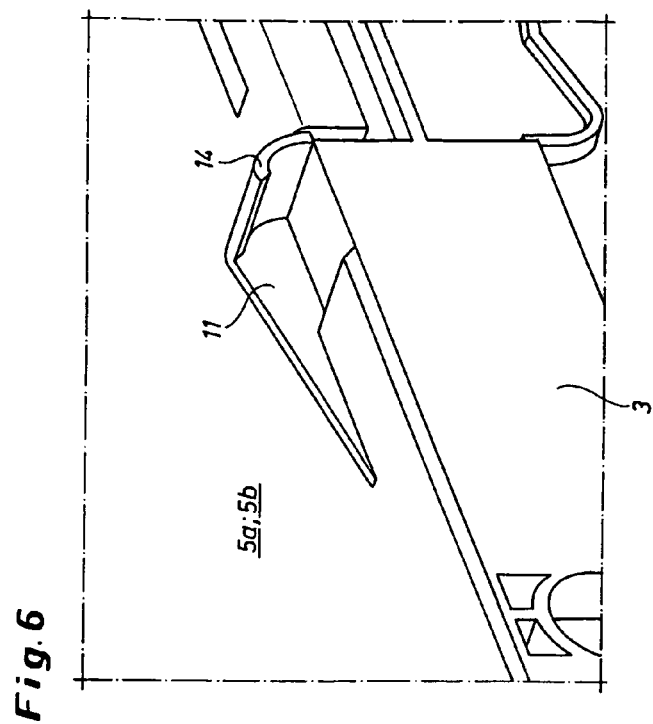
FIG. 6 is a detail view of part of the box in the closed condition.
Figure 5:
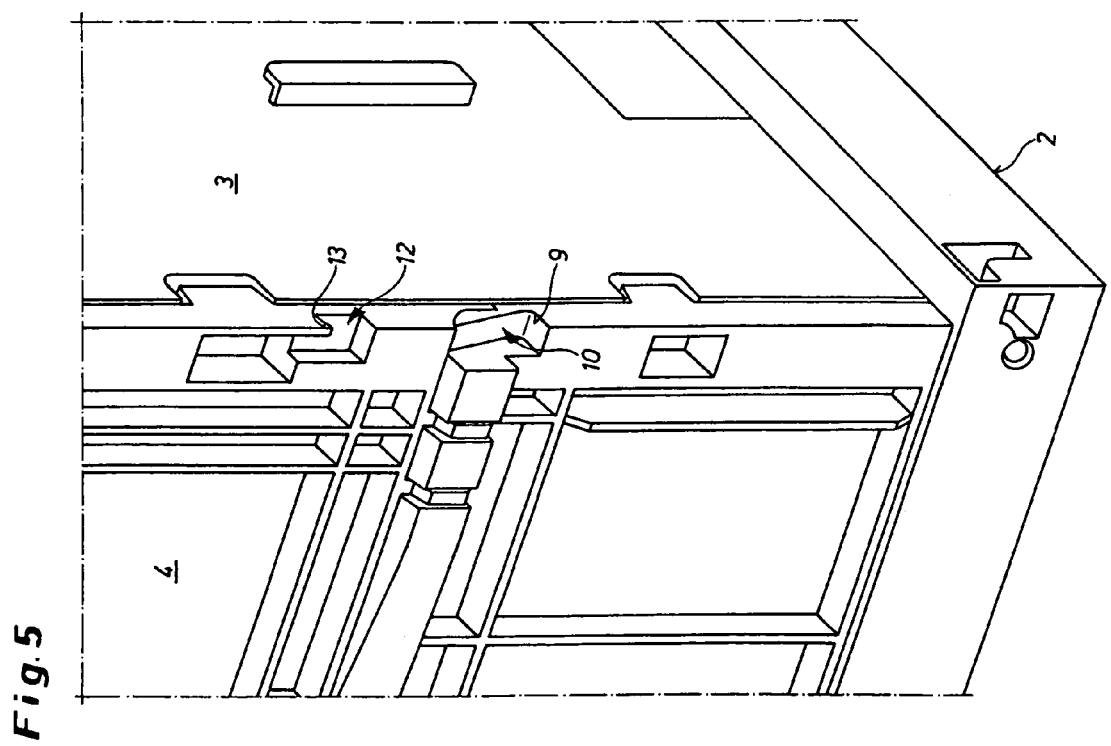
FIG. 5 is another perspective view of the FIG. 4 detail.

As seen in FIG. 1, a box 1 according to the invention basically comprises a rectangular floor 2, a pair of short and upright end walls 3, and a pair of long and upright side walls 4. Hinges 15 secure cover panels or halves 5a and 5b to the upper edges of the side walls 4 for movement of the cover halves 5a and 5b about longitudinal axes A between the open position shown in FIG. 1 in which they hang vertically down against the respective side walls 4, and a closed position in which they are coplanar and horizontal so as to close the top of the box 1.

Each cover half 5a and 5b has along each of its end edges, that is its edges that come to lie atop the end walls 3 in the closed condition, a latch 6 that can be shifted limitedly radially of the respective hinge axis A more or less as shown in above-cited DE 104,136. Each such latch 6 is basically formed as a flat plate lying on an outer face of the respective cover half 5a or 5b, that is the face turned upward in the closed position and toward the respective side wall 4 in the closed position, over a respective throughgoing hole 17 therein. Projecting through the hole 17 to an inner face of the respective cover half 5a or 5b, that is the face that is directed downward in the closed position and that is turned away from the respective side wall 4 in the open position, is an undercut tooth or hook 8 that can engage in the closed position through a keeper hole 16 on the respective end-wall upper edge to retain the respective cover half 5a or 5b in the closed position. On the outer side of the latch 6 there is a handle or grip part 7. In the closed position, the latches 6 of the cover halves 5a and 5b can be pushed toward the respective pivot axes A to disengage their hooks 8 from their respective holes 16 and allow the cover halves 5a and 5b to be pivoted out into their open positions. A spring arm 18 on each hook 8 bears against the inner edge of the respective hole 17 and biases the respective latch 6 radially outward.

According to the invention as shown in FIGS. 2 to 5 the outer edges of the side walls 4, that is the edges which border the end walls 3, are each formed with a cutout 10 having an undercut portion 9 in which the respective grip part 7, which is generally complementarily shaped, can fit. Thus when the cover halves 5a and 5b are swung out of the closed position and pressed against the outer faces of the respective side walls 4, each grip 7 will snap into its cutout 10 and thereby latch the cover half 5a or 5b against the respective side wall 4. To disengage the cover halves 5a and 5b and swing them back into their closed positions, they can either be simply pulled away from the respective side walls 4, with some modest elastic deformation of the engaging parts, or they can be slid radially outward to pull completely out of the cutouts 10.

In addition each cover half 5a and 5b is formed near each of its latches 6 with a handle 11 having a hooked edge 14 that fits in the open position in an undercut or cutout 12 of a rib 13 formed on the respective side wall 4. Thus when the cover halves 5a and 5b are swung out and pressed against the side walls 5, the handles 7 and 11 will engage in the cutouts 10 and 12 to solidly clip the cover halves 5a and 5b flatly against the respective side walls 4.

Thus this arrangement differs from the prior art only in that the side walls 4 are formed with the seats 10 and 12 in which the handles 11 and grip parts 7 engage. The same latches 6 that hold the cover halves 5a and 5b closed therefore serve to hold them against the respective side walls 4.

I claim:

1. A box comprising:
   a floor;
   end walls projecting upward from the floor;
   side walls projecting upward from the floor and bridging the end walls;
   a pair of cover halves hinged at upper edges of the side walls and each pivotal about a respective hinge axis between a closed position with the cover halves generally coplanar and upwardly closing the box and an open position with the cover halves upright and outer faces of the cover halves engaging outer faces of the side walls;
   respective latches on the cover halves each having an outer grip part projecting from the outer face of the respective cover half and an inner latch part projecting from an inner face of the respective cover half, the end walls having keeper formations in which the latch parts are engageable in the closed position to secure the cover halves in the closed position, the latches being shiftable on the respective cover halves to disengage from the respective keeper formations; and
   grip formations on the outer faces of the side walls latchingly engageable with the grip parts in the open position for retaining the cover halves in the open positions.

2. The box defined in claim 1 wherein the grip formations are cutouts having undercuts in which the respective grip parts fit generally complementarily.

3. The box defined in claim 1 wherein the cover halves are formed on their outer faces with handles and the side walls are formed on their outer faces with formations in which the handles are latchingly engageable.

4. The box defined in claim 3 wherein the formations in which the handles are engageable are undercut.

5. The box defined in claim 3 wherein the grip formations are shaped generally complementarily to the respective grip parts and the formations in the side walls are generally complementary to the respective handles.

6. The box defined in claim 1 wherein the latches are shiftable radially of the respective hinge axes.

7. The box defined in claim 1 wherein the grip parts are hooks.

* * * * *